Figure 1:
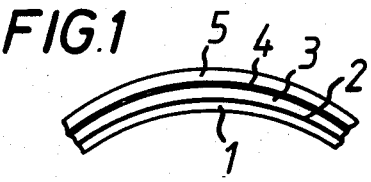

United States Patent [19]

Skarelius

[11] Patent Number: 4,614,208

[45] Date of Patent: Sep. 30, 1986

[54] GASEOUS DIFFUSION RESISTANT TUBE

[75] Inventor: Jerker Skarelius, Virsbo, Sweden

[73] Assignee: Wirsbo Bruks Aktiebolag, Sweden

[21] Appl. No.: 579,552

[22] Filed: Feb. 13, 1984

Related U.S. Application Data

[63] Continuation-in-part of Ser. No. 208,585, Nov. 20, 1980, abandoned.

[30] Foreign Application Priority Data

Nov. 28, 1979 [GB] United Kingdom ............... 7941044

[51] Int. Cl.⁴ .................................... F16L 11/00
[52] U.S. Cl. .............................. 138/103; 138/137; 138/140; 138/178; 428/36
[58] Field of Search ............... 138/128, 137, 140, 141, 138/172, 103; 428/35, 36

[56] References Cited

U.S. PATENT DOCUMENTS

| 2,800,145 | 7/1957 | Peierls et al. | 138/137 X |
|---|---|---|---|
| 2,971,538 | 2/1961 | Brumbach | 138/137 X |
| 3,184,358 | 5/1965 | Utz | 138/137 X |
| 3,956,544 | 5/1976 | Harrington | 138/137 X |
| 4,035,534 | 7/1977 | Nyberg | 138/137 X |
| 4,044,187 | 8/1977 | Kremkau | 138/137 X |
| 4,178,401 | 12/1979 | Neinberg et al. | 138/137 X |
| 4,244,914 | 1/1981 | Ranalli et al. | 138/137 X |

Primary Examiner—James E. Bryant, III
Attorney, Agent, or Firm—Ostrolenk, Faber, Gerb & Soffen

[57] ABSTRACT

A gaseous resistant tube comprising an inner core of a heat resistant polymeric material, typically cross-linked polyethylene, protected outer layer of impact resistant material and an intermediate layer of non-metalliferous gaseous resistant material, wherein the intermediate layer is bonded to at least one of the inner core and the outer layer by bonding material compatible with each of the materials to be bonded and is sufficiently elastic that it will not delaminate or rupture either itself or the adjoining layer under heat cycling conditions. In a preferred embodiment of the invention, the bonding material is preferably a material different from the layer to which it bonds.

1 Claim, 3 Drawing Figures

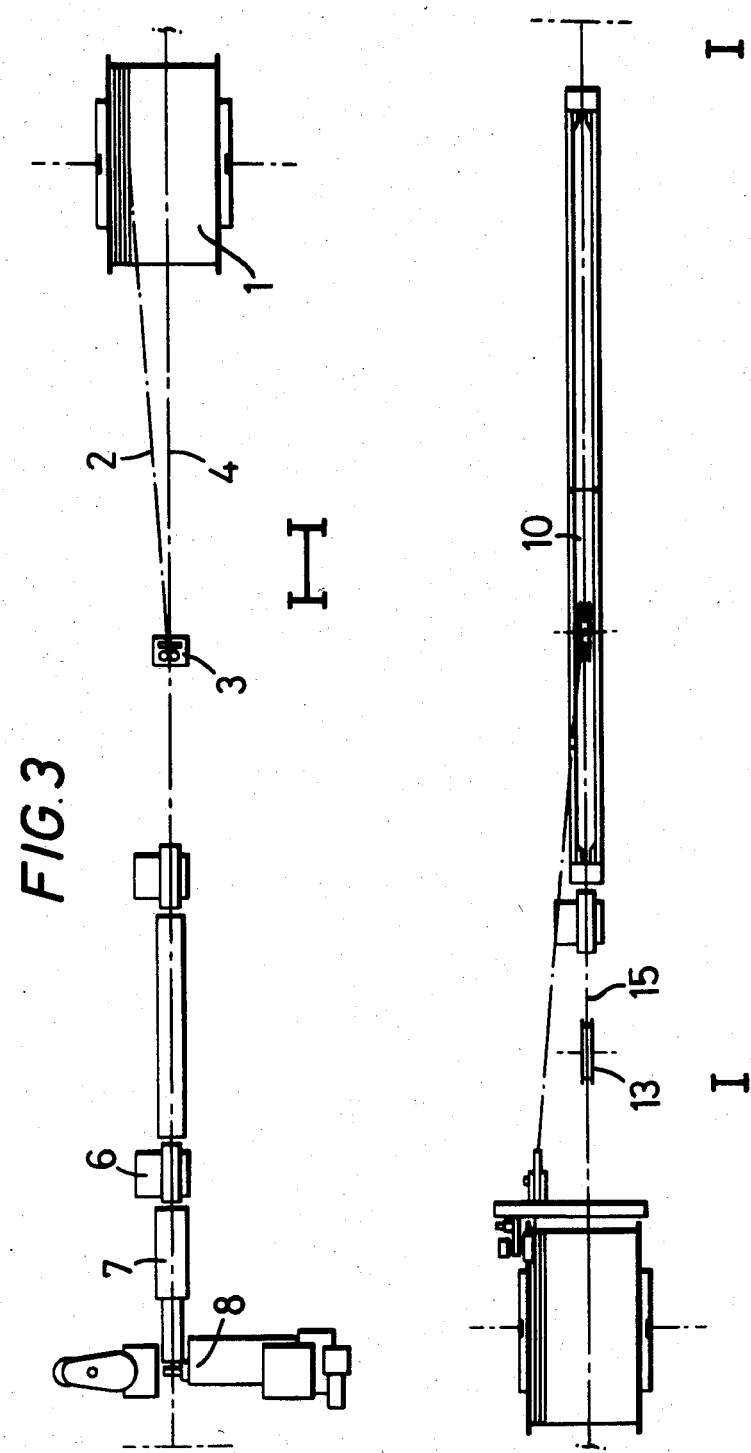

GASEOUS DIFFUSION RESISTANT TUBE

DESCRIPTION

This application in a continuation in part of U.S. Ser. No. 208,585 Jerker Skarelius, filed on Nov. 20th., 1980, now abandoned.

British Patent Specification No. 1,158,011 describes and claims a method of forming a cross-linked material which comprises subjecting a cross-linkable material to a plurality of instanteous compressions at a pressure greater than 2,000 atmospheres to raise the temperature of the material to a level just below the threshold which crosslinking of the material takes place, forming or shaping of the material and thereafter causing or allowing crosslinking of the material to occur. Material produced in accordance with Patent No. 1,158,011 has been found to be an excellent material for use in the piping of hot water and materials generally having a temperature not above 120° C. and not being a solvent for the particular crosslinked polyolefin. In particular, cross-linked polyethylenic material formed in accordance with Patent No. 1,158,011 has been found excellent in use for a large number of years.

With the advent of more rigorous operating conditions, a demand has risen for a gaseous diffusion resistant plastics tube otherwise having the properties of the crosslinked material produced in accordance with British Patent No. 1,158,011 referred to above. Many proposals have been put forward and typical of them are proposals to include a layer of metal foil bonded to the crosslinked polyolefinic material either on a surface thereof or bonded as an intermediate layer therein. This solution suffers from the disadvantage that while the initial construction works well, continued heat cycling produces eventual delamination of the foil layer from the adjacent layers within the tube and/or produces cracks or splits. The effect of delamination and/or cracks or splits is to allow once again the passage of gas through the material via the breaks and/or the splits in the material itself. This has been a problem that has been long known in the construction of, for example, telephone cables and many attempts have been made to overcome it. The solutions for telephone cables are not, however, compatible in this particular case, since the continual heat cycling of the tube used in a heating system whereby the temperature of the tube is continuously alternating between hot and cold, (e.g.: 5° C. to 95° C.) produces a more rigorous environment. The basic problem is that the differential expansion between the core material of the tube and the material constituting the gaseous diffusion resistant layer has to be such that the integrity of each and the bonding of one to the other is maintained.

U.S. Pat. No. 3,561,493 describes a composite tube comprising two or more layers in which each discrete layer is conjoined with its neighbour by means of a jointing layer composed by mixtures of the two constituent plastics which separately form the discrete layers to be conjoined. While such a construction may be acceptable in terms of mechanical strength and ageing resistance, it is not per se suitable in circumstances where repeated temperature cyeling occurs since shear forces are generated which lead to delamination of such composite tubes.

U.S. Pat. No. 3,184,358 also relates to the production of laminated tubing; and proposes a method for increasing the bond between co-extruded thermoplastic layers, eg: polyethylene and nylon.

In one example of this method linear polyethylene and linear nylon are used. These polymeric linear materials are provided with a number of substitutable hydrogen atoms by way of available cross-links at their surface.

Polystyrene gas is interposed between the materials to provide a molecular cross-link via the styrene molecules. This provides a good bond under heat stable conditions. However, under heat cycling the differential coefficient of linear expansion of the materials leads to deformations and cracks over the longer term, and hence, oxygen penetration.

This process, in addition to failing to provide a product which is heat-cycling stable, is also chemically unsuited to use with fully cross linked materials, since such materials have no sites for styrene substitution.

Accordingly, a new approach to the provision of heat-cycling stable gaseous diffusion resistant tubes was required. Another possible approach to the manufacture of polymeric laminates lies in U.S. Pat. No. 4,044,187. This relates to the production of gaseous diffusion resistant tubes comprising a core of a material which is fully cross-linked, and a second and, optionally, a third material which is partially cross-linked. This process requires substrate irradiation, laminate formation, and reirradiation of the so formed laminate, and hence is not suitable to co-extruded products.

The irradiation provides a good cross-linking, but because cross-linking radically effects linear expansion in response to heat and because the material must be differentially cross-linked, the product is only suitable for its intended use as a food container. If subjected to heat cycling, some delamination must occur, particularly if placed under internal pressure at a temperature cycling hourly or longer between 5° to 95° C. Thus, the approach of this application is of no help in the production of heat-cycling stable thermoplastic tubes.

We have now found that an improved product of this type can be produced by using as a core, a fully cured or cross-linked material, and subsequent bonding layers which substantially eliminate discontinuities therein; such for example as may occur with the inclusion of small air bubbles trapped between the intermediate layer and the inner or outer layer.

According to the present invention, there is provided a dimensionally stable gaseous resistant tube comprising a liquid resistant inner core of a heat resistant fully cured or cross-linked polymeric material, a protective outer layer of an impact resistant polymeric material, both being formed of materials having substantially similar coefficients of linear expansion, and an intermediate layer of a non-metalliferous gaseous resistant material interposed therebetween and adhering thereto, wherein the intermediate layer adheres directly or indirectly to the inner core and to the outer layer and is sufficiently elastic such that it will not delaminate or rupture either itself or the adjoining layer under heat cycling conditions.

The intermediate layer may be any gaseous resistant plastics material bondable with both the inner core and the outer layer. The intermediate layer may be bonded by bonding means which may be a priming layer and/or adhesive layer to assist bonding. The bonding means is preferably a priming layer and/or adhesive layer dissimilar to the material to be bonded. Where both a priming layer and an adhesive is employed at least one should be dissimilar to the material of adjacent layer to be bonded. A typical construction is the use of a polyvinyl alcohol as a gaseous resistant layer having a priming layer of polyurethane and a thin layer of polyethylene applied thereto to assist bonding to a crosslinked polyethylenic inner core and a graft polyethylene copolymer with a silane or a like material having high impact resistance as the outer layer.

The invention may also include a method of forming a gaseous resistant tube which method comprises preheating a tube core material to a temperature of at least 60° C., wrapping an intermediate layer of gaseous resistant material bondable to said core about said preheated core material to produce a longitudinal overlap, heat sealing said overlap longitudinally of said core and extruding an outer layer about said material under conditions of heat and pressure such that any gaseous matter in the interface between the core and intermediate layer is removed therefrom and such that bonding between the core and the intermediate layer and the outer layer takes place.

At this stage, heat may be applied to the core and/or to the core and intermediate layer before the extrusion. The intermediate layer is preferably biaxially stretched and heat shrinkable, the arrangement being such that an extrusion of the outer layer thereabout the intermediate layer is caused to shrink about the core and the sensible heat of the extruded outer layer serves to effect bonding between the intermediate layer of the core and the intermediate layer in the outer layer while the pressure applied during the extrusion step is sufficient to complete the bonding and to squeeze or drive out air bubbles which may otherwise occur between the intermediate layer and one or both of its adjacent layers.

A typical intermediate layer may comprise a layer of polyvinyl alcohol in the form of film having a thickness of 0.01 to 0.06 mm. A priming coat of polyurethane on each surface thereof at a thickness of the order of 0.3 to 3.0 grams per square meter to act as primer may be used, and a compatible glue layer of polyetheylene may be provided to each primed surface having a thickness of the order of 0.025 to 0.035, preferably 0.030 mm in thickness. The intermediate foil is preferably biaxially stretched so that it shrinks onto the core on heating.

The invention includes a method for the manufacture of tubes in accordance with the invention, which method comprises extruding an inner core of heat resistant polymeric material, supplying a laminate of a non metaliferous gaseous resistant layer with bonding material carried thereon, and wrapping said laminate about said inner core unsupported by an internal mandrel, and extruding a protective layer of an impact resistant material over the exposed surface of said intermediate layer, wherein the bonding material is a material different from each of the materials to which it bonds and in that the conditions of heat and pressure of the extrusion step is such as to expel air and to effect bonding between the adjacent layers whereby the finished tube will not delaminate or rupture any layer under heat cycling conditions.

In another aspect of the invention there is provided an apparatus for the formation of a three-layer plastics tube, which comprises:

core supply means for supplying a cross-linked core to a first forming station adapted to form an intermediate layer about said core, extrusion means adapted to extrude an outer layer about the formed intermediate layer and to fix the same thereabout, and cooling and make-up means to store the so-formed product.

The apparatus may include a heating station for heat the core prior to supply of the core to the first forming station.

The core may be formed of a cross-linked polyolefin, preferably cross-linked polyethylene. However, other cross-linked plastics materials, well known to those in the art, are also suitable for particular purposes.

In another embodiment a further layer may be formed and/or bonded with the core and the intermediate layer may be formed thereover. Similarly the outer core may be of a multilayer construction.

Similarly, there are a number of well known thermosetting materials which may equally be extruded to tubular form about the core/intermediate layer preform and heat-set to give a hardened tubular core material.

The intermediate layer and outer layer are most preferably selected such tha their coefficients of heat expansion in their formed condition are much the same, and the same as the core material. Thus, the core and the outer layers may be selected from cross-linked polyolefinic materials, particularly cross-linked polyethylene, while the intermediate layer may be of a material such as polyvinyl alcohol (PVAL EVAL, and PA). Indeed, in some situations a polyethylene coated aluminium foil can be used as the intermediate layer if the coefficients of expansion of the core and the outer layers are adjusted accordingly to reduce or eliminate heat shear on heat cycling.

The core material may be selected only for its inertness to the intended fluid of use in the bore of the core, the intermediate layer may be selected only for its gaseous diffusion resistant properties, while the outer layer may be selected only on the basis of its resistance to impact, with the provision that the three materials selected must be fusible at their interfaces with, or without the use of adhesives.

The outer layer is usually selected in part at least for its heat impact and chemical resistance. A suitable material for the outer layer may be Sioplas E (Registered Trade Mark) or any standard free radical initiated crosslinked polyolefin.

The bonding means in accordance with the invention may be applied between only one of the layers. Thus, in the case where the core is of cross-linked polyethylene, and where PVA1 is the intermediate layer, heat and pressure alone can be utilized to bond the intermediate layer to the core. Where the outer layer is of Sioplas E the heat of extrusion of cross-linking can be utilized to fuse the other layer to the intermediate layer but in this case the outer surface of the PVA1 layer is best primed with polyethylene as an adhesive.

If the temperature for forming the various layers are correctly inter-related, the overall heat input can be reduced by utilizing any exothermic reactions generated in the cross-linking reactions to bond not only the outer layer to the intermediate layer, but also the intermediate layer to the core.

Thus, in a preferred embodiment of the invention a core of cross-linked polyolefin or similar material is preheated and a film of PVA1 or similar material carrying any necessary bonding layer(s) is formed thereover in longitudinal overlapping relation, the overlap being heat and/or pressure sealed to secure the intermediate in its correct orientation about the core along an axial line. This has the benefit of enhancing the diffusion resistance of the construction to gas. The resultant core-/intermediate layer preform is then fed to an extruder head and the outer material such as Sioplas E is coextruded thereabout in a continuous layer. The heat and outer diameter of 20 mm and an inner wall thickness of 2 mm. Each sample was tested for oxygen diffusion against a similar control sample which had either no coating thereon or only a thin coating of an adhesive with no oxygen diffusion resistant capabilities.

The results are set forth in the following table:

TABLE 1

Impact and oxygen diffusion resistant samples with and without separate oxygen diffusion resistant layer.

| MATERIAL OF TRANSFER PIPE | OXYGEN DIFFUSION RESISTANT LAYER | SEPARATE IMPACT RESISTANT LAYER | COMPARATIVE DIFFUSION CHARACTERISTICS |
| --- | --- | --- | --- |
| (1) 2 mm PEX | 20µ PVAL | 0.3 mm PE | <1/5th control |
| (2) 2 mm PEX | 20µ PAN | 0.3 mm PE | <1/5th control |
| (3) 2 mm PEX | 40µ PVAL | 0.3 mm PE | <1/10th control |
| (4) 2 mm PEX | 40µ PAN copolymer BAZEX (RTM) | 0.3 mm PE | <1/10th control |
| (5) 2 mm PEX | 40 chlorinated PVC. | 0.3 mm PE | <1/5th control | pressure from this co-extrusion not only fuses the outer layer to the intermediate layer, but also the intermediate layer to the inner core.

Alternatively, the intermediate and core layers may be fully bonded prior to the application of the outer layer if desired.

A suitable material for forming the outer layer which may also include pigment, is a graft copolymer of polyethylene with a silane. In such a process raw polyethylene granules are admixed with vinyl trimethoxy silane (VTMOS) and a peroxide to form a graft copolymer. The graft copolymer when heated (for example during extrusion) in the presence of a catalyst such as dibutyltindilaurate forms a suitable high impact heat and stress-cracking resistant polymer for use as the outer layer of the three-layer product.

Coloured elongate strips may be applied by a suitably positioned extruder, and heat extruding a strip of the desired material onto the outer periphery of the outer layer.

The invention will now be described, by way of illustration only, with reference to the accompanying drawings which show, In FIGS. 1 and 2 diagrammatic cross-sections through segments of oxygen diffusion resistant tubes in accord with the present invention, and FIG. 3 shows a diagrammatic plan view of an extrusion apparatus in accordance with the invention.

Figure 2:
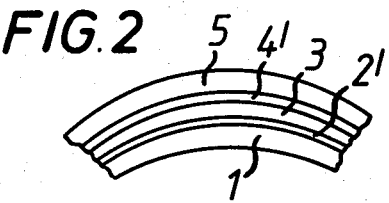

FIG. 1 shows a cross-linked polyethylene (PEX) tube 1 fused to an oxygen diffusion resistant layer of PVAL 3 which in turn is fused to an impact resistant layer of linear polyethylene per se 5; and FIG. 2 shows a PEX tube 1 having an adhesive interlayer 2' and 4' disposed respectively between the PEX tube 1 and an oxygen diffusion resistant layer PAN 3 and between the said layer 3 and a polyethylene impact resistant layer 5.

Where the materials forming layers 3 and 5 cannot be coextruded with the tube 1 they may be applied by spraying, dipping or wrapping as required. The thickness of the layer 3 should be such as to reduce oxygen diffusion by at least 1/5th of that of the core material, and it is preferred that the thickness of the layer 3 is between 1/100 and 1/10 of the wall thickness of the core.

By way of this example, the following layers were all applied to samples of a PEX tube. Said tube had an It can thus be seen that particularly advantageous results can be achieved with a layer between 20 and 40µ thick of PVAL or PAN over a PEX tube. This will reduce oxygen diffusion to less than 1/10th. of the diffusion expected through a PEX tube with a 2 mm wall thickness and an outer diameter of 20 mm.

The use of tubes made in accord with the invention has been found in practice to considerably reduce the instance of corrosion in central heating systems and this leads to a reduction in the required servicing frequencies.

Because the diffusion resistant layers can be formed during the production of normal PEX tubes, tubes according to the invention can be produced for much the same cost as that of ordinary PEX tubes. Consequently, oxygen diffusion resistant pipes can be utilized in the installation of central heating systems without a significant extra cost and with material long term benefits. It will also be appreciated that the comparatively thin non-structural oxygen diffusion layer allows a greater flexibility than with metal foil oxygen diffusion resistant layers and allows a close match of coefficients of linear expansion by virtue of the slight elasticity of said oxygen diffusion resistant layer.

Tubes of this invention have a materially improved long term structural integrity when utilized in central heating installations.

With reference to FIG. 3 of the drawings, there is provided supply reel 1 of generally known type disposed on a stand and adapted to unwind a supply of cross-linked polyethylene tube hereinafter referred to as "pex" tube. The pex tube may then pass a preheater which heats the surface of the core to facilitate bonding to the PVAL laminate.

Indicated generally at 4 is a polyvinyl alcohol laminate the laminate 4 and the pex tube 2 being fed to a centering device 3 which acts both to form the laminate 4 about the pex tube and to centre so-formed layers relative to the extrusion apparatus. The polyvinyl alcohol laminate comprises an intermediate layer of polyvinyl alcohol with a surface coating of polyethene for juxtapositioning with the pex core.

The heated preform is then fed to a shaping device 6 and welding device 7 sequentially. At the shaping device 6 the laminate 4 is formed into a longitudinal overlapping relation upon the pex tube 2 and welded thereto in welding means 7 by the application of axially applied heat and pressure to the seam thereformed. The heat applied should be sufficient to raise the temperature of the pex tube and/or the laminate surface at or towards their melting points and the pressure should be such as to expel air and effect bonding. The heat and pressure can be effected using a fluid with a high boiling point and under hydrostatic pressure, i.e. a molten salt bath or a molten metal bath.

Infra-red radiation and laser bonding may be used, instead of or in addition to, applied heat.

The so-formed preform is then fed to extrusion head 8 wherein a continuous layer of Sioplas E is coextruded thereupon, both to form continuous outer layer of impact resistant material to expel any air inclusions, and to heat the preform to a temperature at which fusing of both the outer layer and intermediate layer, and the intermediate layer core layer inferfaces are assured.

The so-formed three-layer product on passing from the extruder 8 is fed to a cooling bath 10. There is a spatial distance between the extrusion head 8 and the cooling bath 10 which is adjustable so as to allow a sufficient time for the fusing and cross-linking reactions to proceed to their completion. The spatial distance is a function of the speed of the process line and the speed of the reaction, which is governed by the temperature which can be attained at the extrusion head.

The formed product 15 is then led over a guide 13 and taken up on a take up reel (not shown).

By use of the apparatus in accord with the present invention the three-layer product can be formed some five to ten times faster than the production of the core tube alone, and considerably faster than the case where coextrusion is utilized.

Following is a description by way of example only of one method of carrying the invention into effect.

EXAMPLE

A tube formed of crosslinked polyethylene produced generally in accordance with Patent No. 1,158,011 having an outside diameter of 19.5 mm and a wall thickness of 1.7 mm was heated to a temperature of 70° C. Using the apparatus described with reference to FIGS. 1 and 2 of the accompanying drawings, a commercial foil laminate was then applied to the preheated crosslinked polyethylene core. The foil in the form of a longitudinal sheet was biaxially stretched polyvinyl alcohol foil having a thickness of 0.015 mm having a priming layer of polyurethane on either side thereof at a coating weight of 0.5 gram per square metre and carrying a bonding layer of polyethylene having a thickness of 0.03 mm. The foil had a total thickness, therefore, of 0.075 mm. The foil was then wrapped longitudinally as described above and sealed with an overlap of about 5 mm. A heating shoe was then applied to the overlap, the temperature of the shoe being approximately 145° C. A graft copolymer of polyethylene with silane was prepared by mixing polyethylene granules with vinyl trimethoxysilane and a peroxide to form a graft copolymer. A proportion of a catalyst dibutyltin dilaurate was then added so that on heating, the graft copolyer was capable of being extruded and exposure of the material on cooling would cause or allow crosslinking of the material to take place thereby forming a high impact protective outer layer. The graft copolymer was then heated to a temperature of about 170° C. and extrusion of the material was proceeded with at a pressure of about 100 atmospheres in order to effect shaping of the material about the core and intermediate layer contained thereby. The temperature of the graft copolymer as extruded together with the pressure applied was sufficient:

1. to expel any air between the graft copolymer and the intermediate layer and the intermediate layer and the core, while the temperature was sufficient;

2. to cause the intermediate layer to shrink due to its biaxial prestretch;

3. sufficient to cause bonding between the core of polyethylene coated in the intermediate layer adjacent thereto and between the graft copolymer of polyethylene coating on the outer surface of the intermediate layer to produce an a unitary construction having a consistant and continuous layer of gaseous resistant material, in this case polyvinyl alcohol extending within the wall of the tube.

The presence of air and moisture is sufficient to cause the graft copolymer to crosslink and once the crosslinking reaction has proceeded to completion, the outer layer acquires the properties of high impact outer cover.

Tubes formed in the manner described above have been found to provide excellent resistance to gaseous diffusion within the tube, and tubing produced in this was has excellent longevity.

I claim:

1. In a heating system using gaseous resistant tubing and subject to temperature variations from about 5° C. to 95° C., the improvement which comprises:
   (i) a liquid resistant inner tubular core of a heat resistant, cross-linked polyethylene material;
   (ii) a protective outer tubular layer of an impact resistant polymeric material of a graft copolymer of polyethylene with a saline; and
   (iii) an intermediate tubular layer of a single, non-metalliferous gaseous resistant material comprising a layer of polyvinyl alcohol, ethylvinyl alcohol or polyacrylonitrile having on each side a priming layer of polyurethane and a layer of polyethylene, wherein said polyethylene layers of the intermediate layer adhere to the inner tubular core and to the outer tubular layer respectively to form an integral laminate, and said polyethylene material, impact resistant polymeric material and gaseous resistant material have substantially similar coefficients of linear expansion and the intermediate layer is sufficiently elastic, such that when the gaseous resistant tube is cycled from about 5° C. and 95° C. there is substantially no delamination to rupture of the intermediate layer.

* * * * *